United States Patent
Kim et al.

(10) Patent No.: US 8,156,201 B2
(45) Date of Patent: Apr. 10, 2012

(54) UNIFYING DISCOVERABILITY OF A WEBSITE'S SERVICES

(75) Inventors: Jane Kim, Seattle, WA (US); Sean Lyndersay, Seattle, WA (US); Walter Von Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 11/676,875

(22) Filed: Feb. 20, 2007

(65) Prior Publication Data

US 2008/0201367 A1 Aug. 21, 2008

(51) Int. Cl.
*G06F 15/16* (2006.01)

(52) U.S. Cl. ......... 709/219; 709/203; 709/217; 709/220

(58) Field of Classification Search .................. 709/203, 709/217, 219, 220
See application file for complete search history.

(56) References Cited

U.S. PATENT DOCUMENTS

| | | | |
|---|---|---|---|
| 6,263,365 B1 | 7/2001 | Scherpbier | |
| 6,823,504 B1 | 11/2004 | Sokolov | |
| 7,035,944 B2 | 4/2006 | Fletcher | |
| 7,181,442 B2 * | 2/2007 | Yeh et al. | 707/770 |
| 7,328,405 B1 | 2/2008 | Hyatt et al. | |
| 7,370,280 B2 * | 5/2008 | Ho et al. | 715/762 |
| 7,467,391 B2 * | 12/2008 | Myllymaki et al. | 719/320 |
| 7,496,637 B2 * | 2/2009 | Han et al. | 709/217 |
| 2004/0088713 A1 | 5/2004 | Myllymaki et al. | |
| 2004/0215791 A1 | 10/2004 | Tsao | |
| 2004/0243685 A1 | 12/2004 | Sabiers | |
| 2004/0243944 A1 | 12/2004 | Sabiers | |
| 2005/0080768 A1 | 4/2005 | Zhang | |
| 2005/0187895 A1 | 8/2005 | Paya | |
| 2005/0193057 A1 | 9/2005 | Owen | |
| 2006/0020657 A1 * | 1/2006 | Liu et al. | 709/201 |
| 2006/0085520 A1 | 4/2006 | Allamaraju | |
| 2006/0085750 A1 | 4/2006 | Easton | |
| 2006/0161513 A1 | 7/2006 | Drumm | |
| 2006/0161655 A1 | 7/2006 | Altenhofen | |
| 2006/0173985 A1 * | 8/2006 | Moore | 709/223 |
| 2006/0206883 A1 | 9/2006 | Sabbouh | |
| 2006/0259577 A1 * | 11/2006 | Fritsch et al. | 709/217 |
| 2007/0005658 A1 | 1/2007 | Myllymaki | |
| 2007/0033261 A1 * | 2/2007 | Wagner et al. | 709/217 |
| 2007/0094350 A1 * | 4/2007 | Moore | 709/217 |

(Continued)

FOREIGN PATENT DOCUMENTS

ZA 2009/05015 9/2010

OTHER PUBLICATIONS

"PCT Search Report and Written Opinion", *Application No. PCT/US2008/054063*, (Jul. 1, 2008),10 pages.

(Continued)

*Primary Examiner* — Phuoc Nguyen

(57) ABSTRACT

Various embodiments provide a unified discovery control that can be incorporated as part of a web browser. The unified discovery control provides a central location that describes various services that a website has to offer. In addition, the unified discovery control can allow the user to interact with the individual services that the website has to offer as by providing the user with the ability to add, update, uninstall and/or otherwise manage the various services that are described in the unified discovery control. Thus, the unified discovery control provides a centralized management system that provides the user with a common, predictable and repeatable user experience for interacting with various services that a website can offer.

13 Claims, 4 Drawing Sheets

U.S. PATENT DOCUMENTS

| | | | |
|---|---|---|---|
| 2007/0156868 A1* | 7/2007 | Keren et al. | 709/223 |
| 2007/0168479 A1* | 7/2007 | Bean et al. | 709/223 |
| 2008/0010319 A1* | 1/2008 | Vonarburg et al. | 707/104.1 |
| 2009/0216884 A1* | 8/2009 | Larvet | 709/226 |

OTHER PUBLICATIONS

"About Kaboodle", http://www.kaboodle.com/zd/aboutus.html.

"BlueOrganizer 3.0: Instant Vertical Search and Tgging", http://wvwv.techcrunch.com/2006/11/20/blueorganizer-launches-powerful-contextual-search/, Nov. 20, 2006.

"Semantic Tools for Web Services", http://www.alphaworks.com/tech/wssem, 2006.

"Towards the jSemantic Web: Collaborative Tag Suggestions", http://www.rawsugarcom/www2006/13.pdf, 2006.

"Foreign Office Action", *Chinese Application No. 200880005340.6*, (Aug. 4, 2011), 11 pages.

"Foreign Office Action", Russian Application No. 2009131535, (Jan. 27, 2012), 7 pages.

* cited by examiner

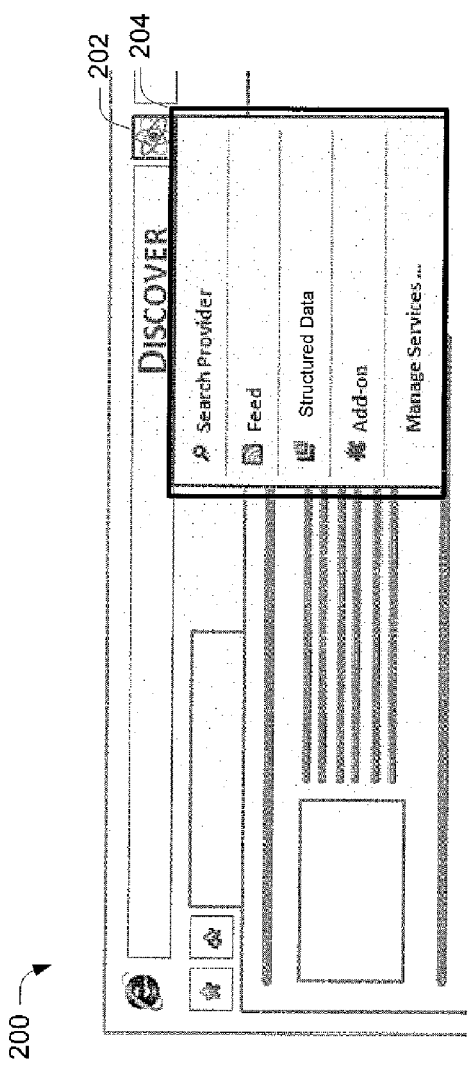
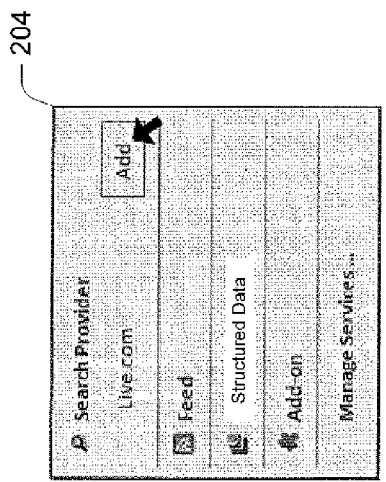
Fig. 2
Fig. 3

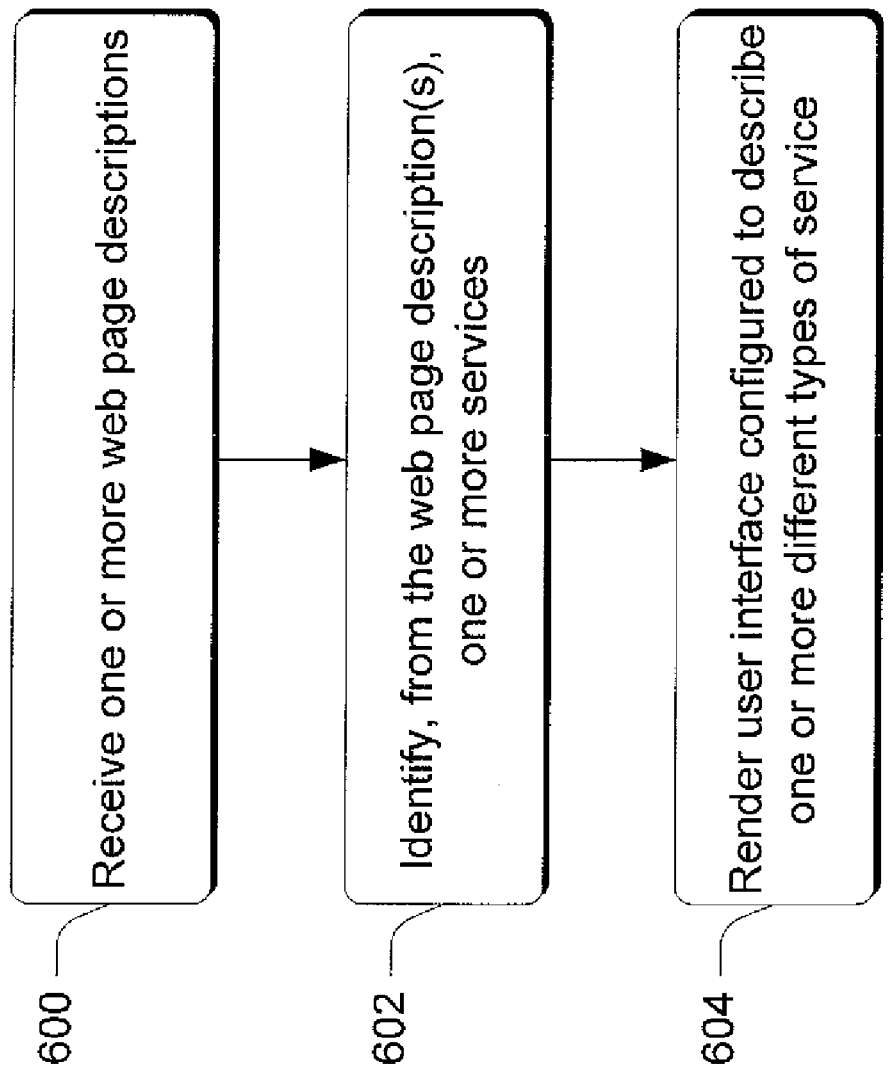

UNIFYING DISCOVERABILITY OF A WEBSITE'S SERVICES

BACKGROUND

Websites can typically provide various services that can be consumed by an individual via their web browser. Such services can include providing search capabilities via a search engine, offering tool bars for installation, offering feeds such as RSS feeds, and a variety of other services. As varied as these services are, so too is the user experience insofar as discovering particular services that are offered, installing a particular service and managing the service once the service is installed. For example, various services might be offered at various physical locations on a web page. This requires the user to hunt and find services in which they may be interested. In addition, once a service is installed, the user experience insofar as interacting with the service—for example to manage the service—is often very specific to that service and varies as between other different services. Hence, in the case of multiple installed services, the user experience is often disparate and disjointed.

SUMMARY

Various embodiments provide a unified discovery control that can be incorporated as part of a web browser. The unified discovery control provides a central location that describes various services that a website has to offer. In addition, the unified discovery control can allow the user to interact with the individual services that the website has to offer as by providing the user with the ability to add, update, uninstall and/or otherwise manage the various services that are described in the unified discovery control.

In at least some embodiments, a visual overlay indicator is provided and is utilized to visually notify a user of where a particular added or installed service can be found in the web browser's user interface.

BRIEF DESCRIPTION OF THE DRAWINGS

FIG. 2 illustrates a portion of an exemplary browser user interface in accordance with one embodiment.

FIG. 3 illustrates an exemplary unified discovery control in accordance with one embodiment.

FIG. 6 is a flow diagram that describes steps in a method in accordance with one embodiment.

DETAILED DESCRIPTION

Overview

Various embodiments provide a unified discovery control that can be incorporated as part of a web browser. The unified discovery control provides a central location that describes various services that a website has to offer. In addition, the unified discovery control can allow the user to interact with the individual services that the website has to offer as by providing the user with the ability to add, update, uninstall and/or otherwise manage the various services that are described in the unified discovery control.

In at least some embodiments, a visual overlay indicator is provided and is utilized to visually notify a user of where a particular added or installed service can be found in the web browser's user interface.

The unified discovery control provides a centralized management system that provides the user with a common, predictable and repeatable user experience for interacting with various services that a website can offer. In the discussion that follows, a section entitled "Exemplary System" is provided and describes but one exemplary system in which the inventive embodiments can be utilized. Following this, a section entitled "Discovering a Website's Services" is provided and describes various ways in which a website's services can be discovered. Following this, a section entitled "Exemplary Unified Discovery Control" is provided and illustrates, by way of example and not limitation, one way in which a unified discovery control can be implemented.

Exemplary System

Figure 1:
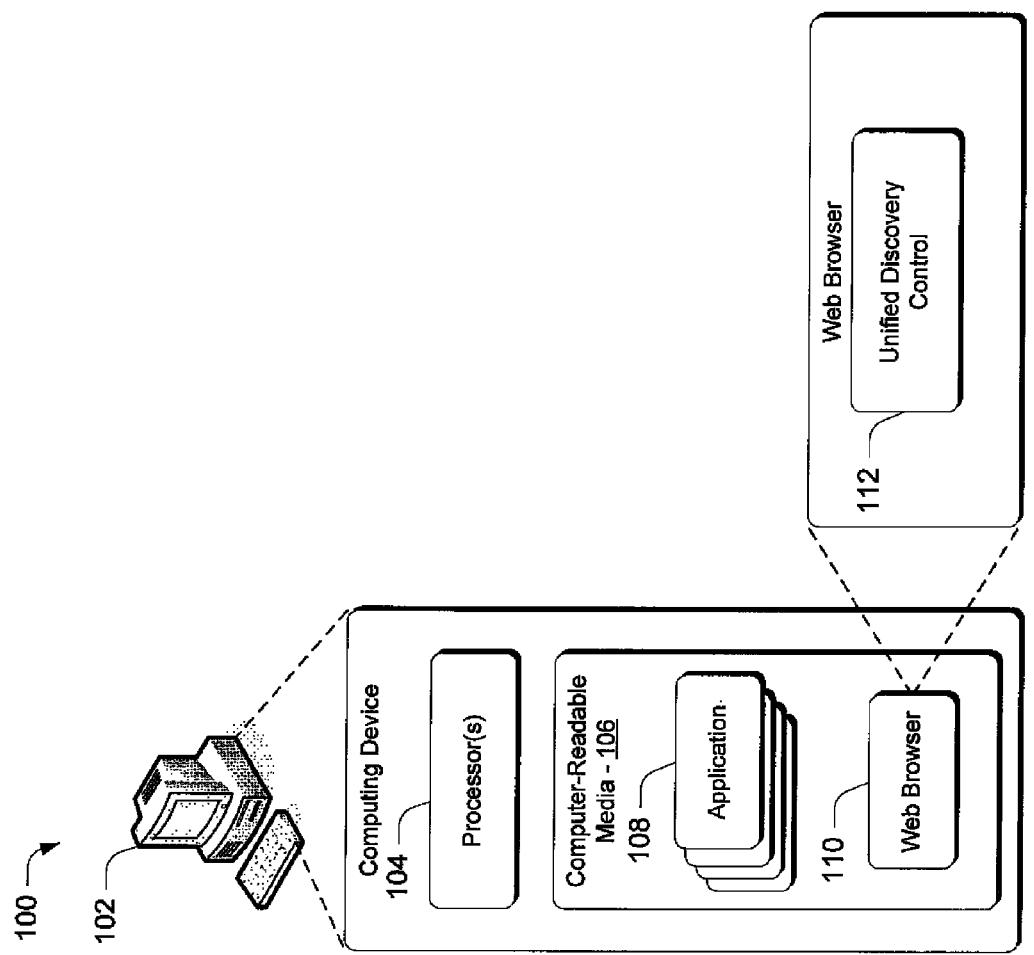
FIG. 1 illustrates a system in which the inventive principles can be employed in accordance with one embodiment.

FIG. 1 illustrates a system in accordance with one embodiment generally at 100. System 100 includes a computing device 102 having one or more processors 104, one or more computer-readable media 106 and one or more applications 108 that reside on the computer-readable media and which are executable by the processor(s). In addition, computing device 102 includes an application in the form of a web browser 110. Any suitably configured web browser can be utilized examples of which are commercially available from the assignee of this document, as well as others.

In one or more embodiments, the web browser includes or otherwise makes use of a unified discovery control 112 which functions as described above and below. It is to be appreciated and understood that while the unified discovery control is depicted as comprising part of the web browser itself, the unified discovery control could comprise a standalone component whose functionality is utilized by the web browser.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

Having introduced the general notion of a unified discovery control, consider now some different ways in which the unified discovery control can discover which services a particular website has to offer.

Discovering a Website's Services

As noted above, websites can offer a variety of services. Services can come in many shapes and sizes and can include, by way of example and not limitation, search services, subscription services, extension services, roaming services, services for discovering structured data, multimedia download services, feed services, file upload services, link sharing services, product finding services, address mapping services and the like.

One way in which the unified discovery control can discover which services a website offers is by examining the various web page descriptions that it receives when a user navigates to a particular site. For example, web pages are typically described using a hierarchically, tagged-based language such as HTML. When the web browser receives a web page's HTML, it typically parses the HTML prior to rendering the web page for the user. In one or more embodiments, when a web page's HTML is parsed, the unified discovery control can look for service descriptions in the HTML. For example, the various service descriptions might be delineated by individual tags that are specific to the service type, or are more generally associated with the services that are offered by the website. Once the unified discovery control has ascertained which services are offered, the discovery control can cause a user interface component to be rendered which indicates the presence of these services for the user. One example of such a user interface component is provided below.

Another way in which the unified discovery control can discover which services a website offers is by examining and analyzing the content of a web page itself as by applying a set of heuristics to a web page. Specifically, in some instances the services that a website offers might not be readily apparent from its associated HTML. In this case, the unified discovery control can examine a page and look for characteristics associated with a service. For example, an embedded hyperlink can serve as an indication of a service. Alternately or additionally, the unified discovery control can search for the text "download" and whether there is a link to a "exe" associated with it.

Regardless of the manner in which services are discovered, once discovered, the unified discovery control can present a user interface experience that allows the user to ascertain which services are offered and to interact in a more centralized, meaningful way with the website's services.

Exemplary Unified Discovery Control

In one or more embodiments, once the various services that a website offers are discovered, the unified discovery control can present a user interface component that informs a user that the website offers one or more services.

As an example, consider FIG. 2 which illustrates a portion of an exemplary browser user interface generally at 200. In this example, user interface 200 includes a service button 202. In one or more embodiments, when a website has one or more services that it offers, the service button 202 can be rendered in a visually distinctive way to inform a user that one or more services are offered. For example, in at least some embodiments, the service button 202 can be rendered so that it glows, thus attracting the attention of the user.

In this particular example, when the user hovers their cursor over the service button 202, a portion of the unified discovery control 204 drops down to expose the various services that are offered by the website. In one or more embodiments, the various services that are offered by a website can be organized and arranged by service type in different service type categories. Thus, in this example, the following service types categories are exposed for the user: search provider service types, feed service types, structured data service types (which is a service that allows a user to discover structured data on a web page), and add-on service types. In addition, in at least some embodiments, the unified discovery control allows the user to manage their particular services through a "Manage Services" tab which is described below in more detail.

In one or more embodiments, the individual buttons or tabs associated with the individual service types can have multiple different states. For example, if there are any new services that the user has not seen, the service type button can glow to attract the user's attention. Additionally, if there are services available that the user has already seen, the button can be visible but not glowing. If there are no services available for a particular service type, the button for the corresponding service type category can be grayed out or not presented at all.

In this example, the search provider service types are associated with one or more search providers that a website may offer. The feed service type is associated with any feeds that the website offers for subscription. The structured data service type is associated with enabling the user to locate structured data that appears on the web page. The add-on service type is associated with various extensions that can be added on such as, for example, tool bars and the like.

In this example, once the user has hovered their cursor over service button 202, they can further ascertain which particular services are offered under any given service type category by specifically hovering their cursor over the particular service type. As an example, consider FIG. 3.

There, unified discovery control 204 is shown in isolation apart from the web browser user interface. Notice here that the user has hovered their cursor over the search provider type. Responsively, the various offered search providers are exposed via a drop down menu which also exposes one or more management instrumentalities. In this example, the management instrumentality is an "add" button which allows the user to add the particular service. Once the user adds a particular service, the service can be added to their browser and used—even when the user navigates away from the site.

Figure 4:
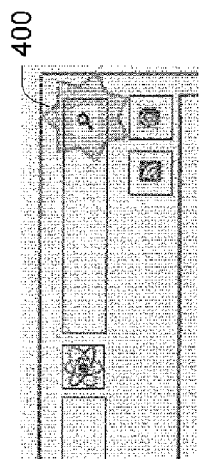
FIG. 4 illustrates an exemplary visual indication that indicates where a user can find a particular added service in accordance with one embodiment.

In one or more embodiments, when a user adds a particular service, the unified discovery control provides a visual indication of where the user can find the particular service in their web browser. As an example, consider FIG. 4 in connection with the above example. Assume in the FIG. 3 example that the user has selected to add the search provider "Live.com". Since the added service is a search provider, the search provider control—in this case, a magnifying glass—is rendered in a visually distinct way. In this particular example, a visual overlay control 400 in the form of a bright star is rendered over the control to visually draw the user's eye to the control. It is to be appreciated and understood that any suitable visual indication can be utilized to notify a user as to where to find a newly added service.

Accordingly, the unified discovery control provides a single place in which all of the website's services can be listed and discovered by the user. Thus, users do not have to hunt around a particular web page to find services in which they may be interested.

As briefly mentioned above, in one or more embodiments, the unified discovery control can provide a number of different management instrumentalities that can be used by the user to manage or otherwise interact with the services that are described in the control. For example, one instrumentality can provide an indication that the user is already subscribed to a particular service. In this example, a management instrumentality can be rendered next to the listed service and can indicate "subscribed". Another management instrumentality can indicate that there is an update to a particular service. In this example, an instrumentality can indicate "update". Thus, by clicking on the "update" instrumentality, the service can be automatically updated.

Further, as will be appreciated by the skilled artisan, services of which the web browser is unaware can be offered using the mechanisms described above. That is, as new services evolve, the mechanisms described above can be utilized to discover and present such services to various users for consumption. In this sense, in at least some embodiments, the unified discovery control can provide an easily extensible tool that service designers can utilize to advertise their respective services for consumption.

As noted above, the unified discovery control also provides, in at least some embodiments, functionality that enables a user to manage their particular services. Specifically, recall in FIGS. 2 and 3 that a "Manage Services" tab appears in the control. By selecting this tab, a new dialog can be presented to the user that enables the user to manage their services.

Figure 5:
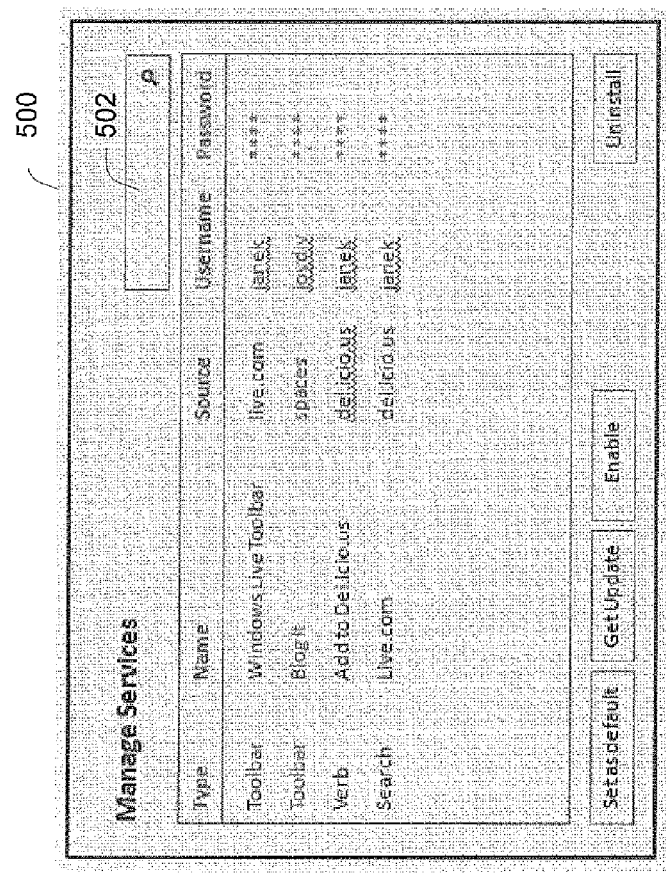
FIG. 5 illustrates an exemplary user interface for managing various services in accordance with one embodiment.

As an example, consider FIG. 5 which illustrates an exemplary user interface 500 for managing various services in accordance with one embodiment. In this example, user interface 500 can allow individual users to see all of the services that they have installed, receive updates, enable/disable a service, and uninstall a service. In this example, each service has its type, name, source, user name and any associated passwords listed. Accordingly, using this interface, a user can not only view all of their installed services, but they can edit credentials as well. In at least some embodiments, search functionality is provided in the form of a search box 502 that can enable a user to search for a particular service using a text-based search.

FIG. 6 is a flow diagram that describes steps in a method in accordance with one embodiment. The method can be implemented in connection with any suitable hardware, software, firmware or combination thereof. In at least some embodiments, the method can be implemented in connection with a system, such as the system that is shown and described in FIG. 1. It is to be appreciated and understood that other systems can be utilized without departing from the spirit and scope of the claimed subject matter.

Step 600 receives one or more web page descriptions. Any suitable web page descriptions can be utilized. In at least some embodiments, the web page descriptions reside in the form of HTML descriptions. Alternately or additionally, some other types of web markup language could be used such as XHTML. Step 602 identifies, from the web page description(s), one or more services that are offered by the web page or its associated web site. An example of how this can be done is provided above. Step 604 renders a user interface that is configured to describe one or more different types of service. Any suitable user interface and method of presenting a user interface can be utilized. In the above example, the user interface resides in the form of a hover-exposed, drop down menu that presents multiple different service type categories under which individual instances of offered services are listed for the user, along with instrumentalities that enable a user to interact in a meaningful way with the services. It is to be appreciated and understood that other types of user interfaces can be utilized without departing from the spirit and scope of the claimed subject matter. For example, the user interface could take the form of a sidebar that is docked vertically adjacent the browser window. Other configurations are, of course, possible.

CONCLUSION

Various embodiments described above provide a unified discovery control that can be incorporated as part of a web browser. The unified discovery control provides a central location that describes various services that a website has to offer. In addition, the unified discovery control can allow the user to interact with the individual services that the website has to offer as by providing the user with the ability to add, update, uninstall and/or otherwise manage the various services that are described in the unified discovery control. In at least some embodiments, a visual overlay indicator is provided and is utilized to visually notify a user of where a particular added or installed service can be found in the web browser's user interface.

Thus, the unified discovery control provides a centralized management system that provides the user with a common, predictable and repeatable user experience for interacting with various services that a website can offer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media devices embodying computer-readable instructions which, when executed, implement a control comprising:
   a unified discovery control that is configured to:
      receive a request to access a website;
      prior to rendering the website, parse markup language of the website to locate service descriptions of services that are offered by the website; and
      provide a central location that describes the services that are offered by the website, the unified discovery control configured to render a user interface component comprising a service button that indicates the presence of the services that are offered by the website, the service button configured to render a service list that lists the services that are offered by the website, the service list including a user interface element that allows a user to manage one or more of the services that are offered by the website, and the one or more services that are offered by the website arranged in different service type catagories.

2. The one or more computer-readable media devices of claim 1, wherein the unified discovery control is configured to enable a user to add, update and uninstall a particular one of the services that are offered by the website.

3. The one or more computer-readable media devices of claim 1, wherein the unified discovery control is configured to provide a visual overlay indicator to visually notify a user of where a particular one of the services that are offered by the website is located.

4. The one or more computer-readable media devices of claim 1, wherein the unified discovery control is configured to discover the services that are offered by the website by examining web page descriptions associated with website.

5. The one or more computer-readable media of media devices 1, wherein the user-selectable tab is selectable to provide a dialog that:
   lists one or more of the services that are offered by the website to which a user a user has subscribed;
   enables the user to receive service updates;
   enables the user to enable/disable services that are offered by the website; and
   enables the user to uninstall the services that are offered by the website.

6. The one or more computer-readable media devices of claim 1, wherein the user interface element is selectable to provide a dialog that lists the services that offered by the website by type, name, source and user name.

7. The one or more computer-readable media devices of claim 1, wherein the user interface element is selectable to provide a dialog that lists one or more of the services that are offered by the website to which a user has subscribed and provides search functionality that can enable a user to search for a particular service using a text-based search.

8. A computing device embodying the computer-readable media of claim 1.

9. A system comprising:
   one or more computer-readable media devices;
   instructions on the one or more computer-readable media devices implementing a web browser having a unified discovery control that is configured to:

receive a request to access a website;

prior to rendering the website, ascertain services that are offered by the website by parsing markup language of the website to locate service descriptions of services that are offered by the website; and present a user interface that lists, in a central location, the services that are offered by the website, the unified discovery control configured to list the services in accordance with selectable service type categories and includes a user interface element that allows a user to manage the services that are offered by the website to which the user has subscribed.

10. The system of claim 9, wherein the unified discovery control is configured to provide a visual overlay indicator to visually notify the user of where a particular one of the services that are offered by the website is located.

11. A computer-implemented method comprising:

receiving a request to access a website;

prior to rendering the website, parsing markup language of the website to locate one or more web page descriptions associated with the website;

identifying, from the web page description(s), one or more services that are offered by the website; and rendering a user interface that is configured to describe, in a central location, the one or more services that are offered by the website, the user interface including a service button that indicates the presence of the one or more services that are offered by the website, the service button configured to render a service list that lists the one or more services that are offered by the website the service list including a user interface element that allows a user to manage one or more of the services that are offered by the website, and one or more services that are offered by the website arranged in multiple different service type categories.

12. The method of claim 11, wherein the act of rendering is performed by rendering a hover-exposed, drop down menu that presents the one or more services that are offered by the website.

13. The method of claim 11, wherein the acts of receiving, identifying and rendering are performed, at least in part, by a web browser.

* * * * *